US008372508B2

(12) United States Patent
Reuter

(10) Patent No.: US 8,372,508 B2

(45) **Date of Patent: *Feb. 12, 2013**

(54) WINDOW FILM FRAME ASSEMBLIES AND METHODS

(75) Inventor: Robert J. Reuter, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 745 days.

This patent is subject to a terminal disclaimer.

(21) Appl. No.: 11/618,015

(22) Filed: Dec. 29, 2006

(65) Prior Publication Data

US 2008/0155910 A1 Jul. 3, 2008

(51) Int. Cl.
*B32B 7/00* (2006.01)

(52) U.S. Cl. .......... 428/212; 428/220; 428/192; 428/38; 52/202; 52/203; 52/509; 52/746.1

(58) Field of Classification Search .................. 428/212, 428/220, 192, 38; 52/202, 203, 509, 746.1
See application file for complete search history.

(56) References Cited

U.S. PATENT DOCUMENTS

| | | | |
|---|---|---|---|
| 1,777,435 A | | 10/1930 | Hogelund |
| 2,046,362 A | | 7/1936 | Baldwin |
| 2,111,343 A | | 3/1938 | Walz |
| 2,238,073 A | | 4/1941 | Patten |
| 2,960,734 A | | 11/1960 | Collins |
| 3,312,023 A | | 4/1967 | Salomon |
| 3,420,728 A | | 1/1969 | Haverstock |
| 3,429,006 A | | 2/1969 | Mattimoe et al. |
| 3,760,860 A | * | 9/1973 | Kelarakis ...................... 160/179 |
| 3,939,620 A | | 2/1976 | Bero |
| 3,990,635 A | | 11/1976 | Algaier et al. |
| 4,068,428 A | | 1/1978 | Peterson, III |
| 4,069,641 A | | 1/1978 | DeZutter |
| 4,075,386 A | | 2/1978 | Willdorf |
| 4,075,802 A | | 2/1978 | Gross et al. |
| 4,095,013 A | | 6/1978 | Burger et al. |
| 4,103,728 A | | 8/1978 | Burdette et al. |
| 4,157,417 A | | 6/1979 | Murphy et al. |
| 4,160,348 A | | 7/1979 | Chapman et al. |
| 4,182,088 A | | 1/1980 | Ball |
| 4,184,297 A | | 1/1980 | Cassamayor |
| 4,189,880 A | | 2/1980 | Ballin |
| 4,191,169 A | | 3/1980 | Hyman |
| 4,242,386 A | | 12/1980 | Weinlich |
| 4,242,414 A | | 12/1980 | Mc Kenzie |
| 4,335,166 A | | 6/1982 | Lizardo et al. |
| 4,358,488 A | | 11/1982 | Dunklin et al. |
| 4,363,192 A | | 12/1982 | Soucy |
| 4,380,140 A | | 4/1983 | Abbott |
| 4,387,541 A | | 6/1983 | Boomershine |
| 4,408,650 A | | 10/1983 | Verch |
| 4,473,980 A | | 10/1984 | Foster |
| 4,494,342 A | | 1/1985 | Decker |
| 4,502,522 A | | 3/1985 | Liljendahl |
| 4,543,755 A | | 10/1985 | Crandell |
| 4,559,732 A | | 12/1985 | Levy et al. |
| 4,569,872 A | | 2/1986 | Chapman et al. |
| 4,649,681 A | | 3/1987 | Eisele et al. |
| 4,693,043 A | * | 9/1987 | Knapp ............................ 52/211 |
| 4,706,729 A | | 11/1987 | Sixsmith |
| 4,724,186 A | | 2/1988 | Kelch |
| 4,749,222 A | | 6/1988 | Inland |
| 4,780,998 A | * | 11/1988 | Knapp ............................ 52/211 |
| 4,831,799 A | | 5/1989 | Glover et al. |
| 4,861,680 A | | 8/1989 | Meyer |
| 4,893,667 A | | 1/1990 | Dunn |
| 4,911,964 A | | 3/1990 | Carrozza et al. |
| 4,948,672 A | | 8/1990 | Cartier |
| 4,975,307 A | | 12/1990 | Sollogoub |
| 4,994,309 A | | 2/1991 | Glover et al. |
| 5,007,217 A | | 4/1991 | Glover et al. |
| 5,074,593 A | | 12/1991 | White |
| 5,104,210 A | | 4/1992 | Tokas |
| 5,107,643 A | | 4/1992 | Swensen |
| 5,117,891 A | | 6/1992 | Simon |
| 5,140,768 A | | 8/1992 | Forbes |
| 5,141,046 A | | 8/1992 | Duncan |
| 5,161,827 A | | 11/1992 | Grosso |
| 5,197,243 A | | 3/1993 | Mozawa et al. |
| 5,258,214 A | | 11/1993 | Cooledge et al. |
| 5,271,994 A | | 12/1993 | Termath |
| 5,322,708 A | | 6/1994 | Eissele |
| 5,426,897 A | | 6/1995 | Gazaway |
| 5,506,037 A | | 4/1996 | Termath |
| 5,629,365 A | | 5/1997 | Razavi |
| 5,712,332 A | | 1/1998 | Kaieda et al. |
| 5,732,760 A | | 3/1998 | Pattison |

(Continued)

FOREIGN PATENT DOCUMENTS

| | | |
|---|---|---|
| AU | 2004100943 A4 | 9/2004 |
| BE | 810268 | 5/1974 |

(Continued)

OTHER PUBLICATIONS

U.S. Appl. No. 11/618,001, "Adapters for Mounting Film Structures and Method" Robert Reuter filed Dec. 29, 2006.

U.S. Appl. No. 11/618,033"Window Frame Assembly for Installation Over Windows and Methods" by Robert Reuter filed Dec. 29, 2006.

U.S. Appl. No. 11/618,050, "Window Film Assembly and Method of Installation" by Robert Reuter filed Dec. 29, 2006.

Brand, Bob, "Window Tint Installation," DodgeRam.org/Main/Tech Index/Window Tint, Last Updated Mar. 1, 1998.

Instructions, "Car Tinting Instructions," TintDude.com from archive.org, Dec. 23, 2005.

*Primary Examiner* — Maria Veronica Ewald
*Assistant Examiner* — Lawrence Ferguson
(74) *Attorney, Agent, or Firm* — David B. Patchett

(57) ABSTRACT

A method, apparatus, and kit adapted for installation over windows or the like. Included is a window film frame assembly that comprises a frame having a plurality of frame segments and a plurality of connector members. Pressure-sensitive adhesive strips are attached to one side of the frame and serve to attach a generally flexible film sheet structure thereto. The film sheet structure is provided so as to conform to the shape of the frame across the frame opening. The film sheet structure does not have an exterior surface coated with an adhesive material.

13 Claims, 4 Drawing Sheets

U.S. PATENT DOCUMENTS

| | | | | |
|---|---|---|---|---|
| 5,749,994 | A | 5/1998 | Sundet | |
| 5,873,975 | A | 2/1999 | Benoit | |
| 5,875,282 | A | 2/1999 | Jordan et al. | |
| 5,887,369 | A | 3/1999 | Danielczak | |
| 5,937,595 | A | 8/1999 | Miller | |
| 5,937,596 | A | 8/1999 | Leeuwenburgh et al. | |
| 5,937,611 | A | 8/1999 | Howes | |
| 5,983,593 | A | 11/1999 | Carbary et al. | |
| 5,992,107 | A | 11/1999 | Poirier | |
| 6,040,061 | A | 3/2000 | Bland et al. | |
| 6,082,545 | A | 7/2000 | Ford et al. | |
| 6,090,451 | A | 7/2000 | Barth et al. | |
| 6,166,852 | A | 12/2000 | Miro | |
| 6,171,681 | B1 | 1/2001 | Freedman et al. | |
| 6,197,419 | B1 | 3/2001 | Hyde et al. | |
| 6,294,233 | B1 | 9/2001 | Barth et al. | |
| 6,367,210 | B1 | 4/2002 | Trundle | |
| 6,386,617 | B1 | 5/2002 | Kusuma et al. | |
| 6,393,777 | B1 | 5/2002 | Renfrow | |
| 6,451,446 | B1 | 9/2002 | Regnier | |
| 6,491,775 | B1 | 12/2002 | Janssen et al. | |
| 6,497,777 | B1 | 12/2002 | Huang | |
| 6,594,957 | B1 | 7/2003 | Milburn | |
| 6,627,017 | B2 | 9/2003 | Simpson | |
| 6,811,841 | B1 * | 11/2004 | Castiglione et al. | 428/34 |
| 6,931,799 | B2 | 8/2005 | Webb | |
| 7,101,615 | B2 * | 9/2006 | Luhmann et al. | 428/317.3 |
| 2001/0045259 | A1 | 11/2001 | Hill | |
| 2003/0138243 | A1 | 7/2003 | Son | |
| 2004/0035082 | A1 | 2/2004 | Hudoba et al. | |
| 2004/0040652 | A1 | 3/2004 | Bharti et al. | |
| 2004/0101647 | A1 | 5/2004 | Pitzen | |
| 2005/0081993 | A1 | 4/2005 | Ilkka et al. | |
| 2005/0178499 | A1 | 8/2005 | Bharti | |
| 2006/0048403 | A1 | 3/2006 | Brister | |
| 2006/0251888 | A1 | 11/2006 | Bamborough et al. | |
| 2008/0155910 | A1 | 7/2008 | Reuter | |
| 2008/0155911 | A1 | 7/2008 | Reuter | |
| 2008/0156423 | A1 | 7/2008 | Reuter | |
| 2008/0160241 | A1 | 7/2008 | Reuter | |

FOREIGN PATENT DOCUMENTS

| | | | |
|---|---|---|---|
| BE | 859381 | A | 4/1978 |
| BE | 881198 | A | 5/1990 |
| CA | 2254457 | A1 | 11/1998 |
| CH | 671373 | A1 | 8/1989 |
| DE | 1704237 | A | 5/1967 |
| DE | 27 53 127 | | 11/1977 |
| DE | 2621251 | A | 11/1977 |
| DE | 3042838 | A1 | 6/1982 |
| DE | 3110492 | A1 | 1/1983 |
| DE | 3832770 | A1 | 11/1990 |
| DE | 4310722 | A1 | 10/1994 |
| DE | 29919653 | A1 | 3/2000 |
| DE | 10054478 | A1 | 5/2001 |
| EP | 69532 | A2 | 1/1983 |
| EP | 591055 | A2 | 4/1994 |
| EP | 607031 | A1 | 7/1994 |
| EP | 1719809 | A2 | 11/2006 |
| FR | 2476733 | A | 8/1981 |
| FR | 2517811 | A | 6/1983 |
| FR | 2546958 | A | 12/1984 |
| FR | 2552368 | A | 3/1985 |
| FR | 2573469 | A | 5/1986 |
| FR | 2672693 | A1 | 8/1992 |
| GB | 2011985 | A | 7/1979 |
| GB | 2031497 | A | 4/1980 |
| GB | 1567983 | | 5/1980 |
| GB | 2033947 | A | 5/1980 |
| GB | 2042038 | A | 9/1980 |
| GB | 2044334 | A | 10/1980 |
| GB | 2262938 | A | 7/1983 |
| GB | 2135371 | A | 8/1984 |
| GB | 2217256 | A | 10/1989 |
| GB | 2231551 | A | 11/1990 |
| GB | 2374893 | A | 10/2002 |
| JP | 58-39452 | | 8/1983 |
| JP | 2185430 | A | 1/1989 |
| JP | 1047479 | A | 2/1989 |
| JP | 2208630 | A | 8/1990 |
| JP | 5008341 | A | 1/1993 |
| JP | 2555619 | A | 9/1996 |
| JP | 10182194 | A | 7/1998 |
| JP | 10266733 | A | 10/1998 |
| JP | 200265747 | A | 9/2000 |
| JP | 2001192242 | A | 7/2001 |
| JP | 2002053824 | A | 2/2002 |
| JP | 2003039603 | A | 2/2003 |
| JP | 2003112391 | A | 4/2003 |
| JP | 2004076545 | A | 3/2004 |
| JP | 2004099759 | A | 4/2004 |
| JP | 2004241718 | A | 8/2004 |
| KR | 2001000380 | A | 1/2001 |
| MX | 2001006813 | A1 | 10/2004 |
| RU | 2214373 | C1 | 10/2003 |
| WO | WO 9013052 | A | 11/1990 |
| WO | WO 9103381 | A | 3/1991 |
| WO | WO 9852749 | A1 | 11/1998 |
| WO | WO 9859143 | A1 | 12/1998 |

* cited by examiner

WINDOW FILM FRAME ASSEMBLIES AND METHODS

CROSS REFERENCE TO RELATED APPLICATIONS

The present application is related to co-pending and commonly assigned U.S. patent applications: U.S. patent application Ser. No. 11/618,001, entitled "Window Film Assembly And Method Of Installing"; U.S. patent application Ser. No. 11/618,033 entitled "Apparatus For Mounting Film Structures And Methods", U.S. patent application Ser. No. 11/618,050 entitled "Apparatus For Mounting Laminates On Substrates And Methods Thereof"; all of which are filed concurrently herewith.

BACKGROUND

The present invention relates generally to frame assemblies carrying films. More particularly, it relates to apparatus, methods, and a kit for easily and reliably assembling window film frame assemblies carrying window films in a manner for avoiding formation of permanent film flows in the films that diminish their optical properties, while at the same time providing for thermal insulation of window assemblies during repeated heating seasons.

Window films are generally transparent plastic and/or metallized laminates that are applied as a thin layer to transparent panels, such as glass windows. Window films are available in many different compositions for bringing about varying effects on the optical and mechanical properties of the underlying transparent panels. Window films can reduce energy costs by minimizing the amount of heat entering a building through sunlight, thereby decreasing the amount of energy needed to cool the building. Window films also act as a filter for reflecting most ultraviolet and infrared wavelengths while allowing passage of visible light. This can result in substantial reductions in cooling costs. As noted, such films reduce the amount of ultraviolet entering a window, and are also often applied to reduce fading of the contents of a room. Other kinds of thin window films include security films that are applied to prevent glass from shattering, as well as privacy films for controlling the visible light transmitted for effecting privacy purposes.

It will be appreciated that several factors are considered in selecting the correct film to be installed. Such factors include visible light transmission, properties of solar energy to be reflected, and aesthetic considerations, such as distortion free viewing following installation.

Because window films are usually installed by applying them to either or both surfaces of flat finished glass, the resulting laminates are less costly than buying chemically altered specialty glass for bringing about the same desired solutions. Because window films provide energy savings and help protect furnishings among other advantages, they are generally considered to be an investment that pays for itself. As such, they have gained widespread commercial acceptance.

Attempts have been made to space transparent films incrementally from windows in order to improve the R-value associated with the windows. An R-value is a rating used to measure how well insulation can resist heat flow. The higher the R-value, the greater the insulating properties and the slower heat and cold flows through it. However, while window films are beneficial they have not necessarily been successfully adapted for use in installation over transparent panels, such as windows. In part, this is due to the films being very thin, such as in the order of about 2 mil. Typically, when applied to a frame for mounting the same, they cannot be kept planar over a frame opening. This is due primarily to their flimsy nature (i.e., they cannot sustain their dimensions). Accordingly, physical distortions of the films may arise and their optical properties are compromised. Because these films tend to be heat shrinkable, one typical approach for addressing their flimsy nature is to apply heat locally on the film. This is usually done with a hair dryer, heat gun, or other similar device. Heating causes the film to shrink over the frame opening, whereby it assumes a taught and generally planar orientation. As such, visual distortions are minimized. However, when heat is applied, it is usually done after the film has been applied to the frame and the film has reached room temperature of its operating environment. In some cases, heat is applied up to 24 hours after the film has been mounted on a frame. Clearly, such additional labor and time inhibit quick and reliable mounting of window film sheet structures to frames and the like.

Unless the window films are properly applied to windows, there is a chance that they will crease and fold, during cutting and installation due to their inherent highly flexible nature. As such there is a chance that they will cause permanent flaws in the film which inhibit their optical properties after being applied. Some of these window films include UV blocking materials that may in certain circumstance even damage the underlying window to which they are applied. As such, it is desired to avoid having the film contact the window.

Also, such window film sheet structures are typically provided with an adhesive layer. The adhesive layer is exposed following removal of a low adhesion release liner and mounted to a window casement or the like. Cutting and installing such thin films tends to be prolematic due to their very flexible nature as well as the adhesive layer sticking to itself in the process. As such, this tends to limit its use in a do-it-yourself application. Also, direct application of the adhesive layers to window casements or the like inhibits reuse from heating season to heating season since the adhesive qualities tend to diminish through repeated usage.

Thus, due to the number and complexity of steps involved in installing inherently flimsy film, along with the adhesive issues associated with installing thin window films, the prior approaches are generally considered time consuming, demanding, as well as potentially costly. These burdens are even more pronounced particularly in the do-it-yourself field, wherein a typical installer has very little experiences handling these materials.

Without the foregoing issues being satisfied, the true potential of successfully applying window film sheet structures providing for thermal insulation as well as avoiding permanent flaws due to their flimsy nature and adhesive qualities may not be fully achieved, especially in a simple, reliable, less time consuming, and less costly manner.

SUMMARY

The present invention provides enhanced methods, an apparatus, methods of making such apparatus, and a kit adapted for making window film frames that are adapted for installation over transparent panels, such as windows in a manner that represents improvements over prior art approaches.

The present invention relates generally to frame assemblies carrying films and, more particularly, to window film frame assemblies adapted for installation over windows as well as maintaining their optical properties. The present invention provides a film frame assembly that comprises: a frame defining a frame opening; one or more pressure-sensitive adhesive portions on at least one side of the frame, and a generally flexible film sheet structure attached to the one or more pressure-sensitive adhesive portions for covering the frame opening, wherein the film sheet structure has stiffness so as to conform to the shape of the film structure across the frame opening.

The present invention provides a method of making a window film frame assembly adapted for use in combination with an opening in a window assembly, the method that comprises: providing a frame defining a frame opening, applying one or more pressure-sensitive adhesive portions to at least one side of the frame, attaching a generally flexible film sheet structure to the adhesive portions wherein the film sheet structure has stiffness so as to conform to the shape of the film structure across the frame opening.

The present invention provides a kit that comprises: a frame defining a frame opening; one or more pressure-sensitive adhesive portions on at least one side of the frame; and a generally flexible film sheet structure that is attachable to the one or more pressure-sensitive adhesive portions for covering a frame opening. The flexible film sheet structure has stiffness such that the film sheet structure generally conforms to the shape of the film structure across the frame opening.

An aspect of the invention is the provision of a method, apparatus, and kit for providing a window film frame assembly adapted for installation over a window assembly.

An aspect of the present invention is a method, apparatus, and kit that achieve the foregoing in a manner that obtains the benefits of installation over window film assemblies by using window film sheet structures that do not require adhesives.

An aspect of the present invention is a method, apparatus, and kit that that are adapted to use window film sheet structures to achieve the foregoing in a manner that minimizes significant distortion of viewable images therethrough.

An aspect of the present invention is a method, apparatus, and kit that are adapted for using window film sheet structures for installation over windows as well as for maintaining their optical properties.

An aspect of the present invention is a method, apparatus, and kit that achieve the foregoing in a manner that minimizes significantly the costs and labor associated with making such window film frame structures.

Another aspect of the present invention is a method, apparatus, and kit that achieve the foregoing in a manner that increases significantly the reliability and ease of installing, such window film sheet structures particularly in a do-it-yourself environment.

The aspects described herein are merely a few of the several that can be achieved by using the present invention. The foregoing descriptions thereof do not suggest that the invention must only be utilized in a specific manner to attain the foregoing aspects.

These and other features and aspects of this invention will be more fully understood from the following detailed description of the preferred embodiments. It should be understood that the foregoing generalized description and the following detailed descriptions are exemplary and are not restrictive of the invention.

DETAILED DESCRIPTION

The words "a", "an", and "the" are used interchangeably with "at least one" to mean one or more of the elements being described. By using words of orientation, such as "top", "bottom", "overlying", "front", "back" and "backing" and the like for the location of various elements in the disclosed articles, we refer to the relative position of an element with respect to a horizontally-disposed body portion. It is not intended that the disclosed articles should have any particular orientation in space during or after their manufacture.

Figure 7:
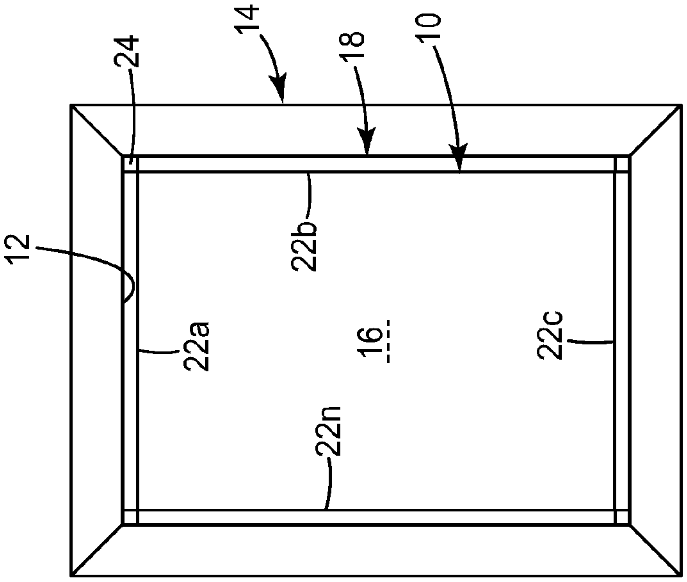
FIG. 7 is a schematic view of the window film frame assembly being installed over a window surface.

Reference is made to FIGS. 1A-8 for illustrating the making and installing of a window film frame assembly 10 (FIG. 7) made according to this invention. As seen in FIG. 7, the window film frame assembly 10 is particularly adapted to be mounted relative to an opening 12 defined by an assembly, such as a window assembly 14. The window film frame assembly 10 is used in combination with and, held in spaced apart relationship to a transparent panel 16, such as a window 16, of the window assembly 14. The window 16 may made of a wide variety of suitable materials, such as glass, plastic, etc. Alternatively, the window film frame assembly 10 can be used independently without a window in the window assembly 14. In the illustrated embodiment, the window assembly 14 is of a residential type. However, the present invention is not limited to such a window system since other suitable systems for doors, panels and the like are envisioned.

The window film frame assembly 10 essentially includes a frame assembly 18 (FIGS. 1A-7) and a window film sheet structure 20 detachably mounted thereon. The frame assembly 18 includes a plurality of elongated frame elements or segments $\mathbf{22}_{a-n}$ (collectively, 22) and a suitable interconnecting frame corner connector members 24 (FIG. 7). The frame segments 22 may be of the type used for window screens, screen doors, and the like. As such, the frame segments 22 have hollow interior portions with open ends for cooperation with the interconnecting frame corner connector members 24 in a manner to be described. The frame segments 22 may be made of roll-formed aluminum or sheet steel, or may even be extruded aluminum. Other suitable materials and constructions may be used, such as wood, plastic or the like.

Typically, frame assemblies of this type include four elongated frame segments, each having generally uniform cross-sections that are interconnected together as will be described by the interconnecting frame corner connector members 24. While a rectangular frame assembly is illustrated, it will be understood that other geometric configurations are envisioned for purposes of matching the contour of the opening into which it is to be installed.

Figure 5:
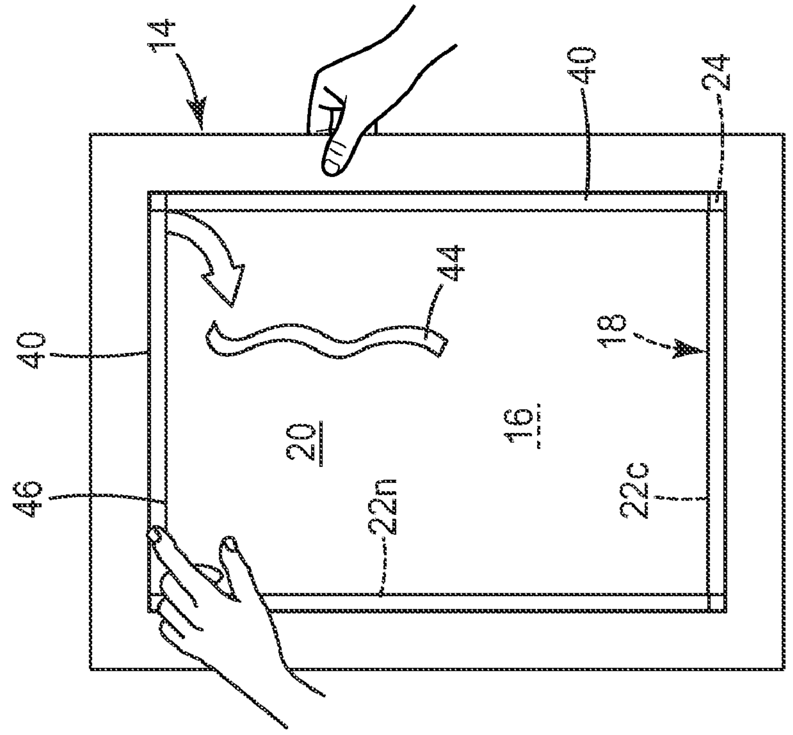
FIG. 5 is a schematic view of a release sheet having been removed prior to placing the window film sheet structure thereover.

As noted, the corner connector members 24 join together the frame segments 22 to form the frame assembly 18 and define a frame opening 26 (FIG. 5). The corner connector members 24 also reinforce the frame assembly 18 to inhibit its twisting or bending during installation and removal from the opening 12. Also, the frame assembly 18 can be held generally flat so as to assist in mounting the window film sheet structure 20 in a generally planar relationship over the frame opening 26. The corner connector members 24 form the exposed corner of the frame assembly 18 and are sized and shaped to match with the ends of the frame segments 22 to form a uniform appearing frame. Each of the corner connector members 24 may have two rectangular shaped legs 28 projecting therefrom that are arranged at right angles. The legs 28 are sized and shaped to frictionally fit within the hollow portions of the frame segments 22 so as to snuggly mater therewith. Also, the corner connector members 24 have edges 29 that are adapted to abut against the ends of the frame segments 22 to act as stops or limits. The corner connector members 24 are made of metal, such as aluminum, but could also be made of molded plastic or other suitable materials. Alternatively, the corner connector members 24 may have other sizes and shapes. For example, instead of legs 28 being used for effecting the connection, the corner connector members 24 may include receptacle portions (not shown) for slidably and snuggly receiving the ends of the frame segments.

Figure 1B:
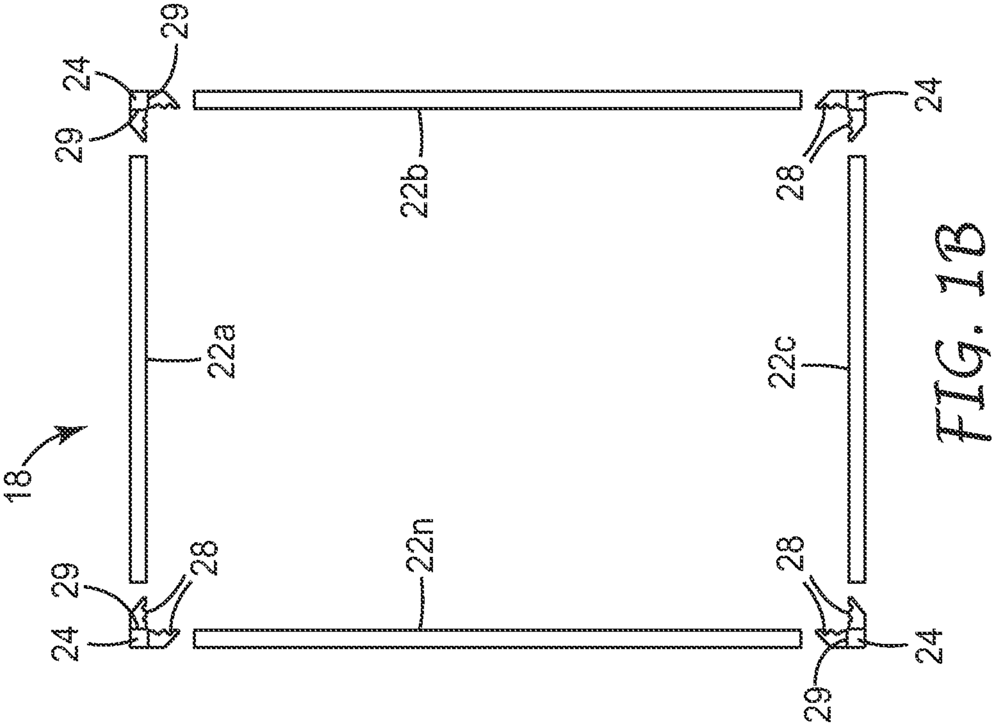
FIG. 1B is a schematic view of another aspect of a method of assembling the frame assembly illustrated in FIG. 1A.
Figure 1A:
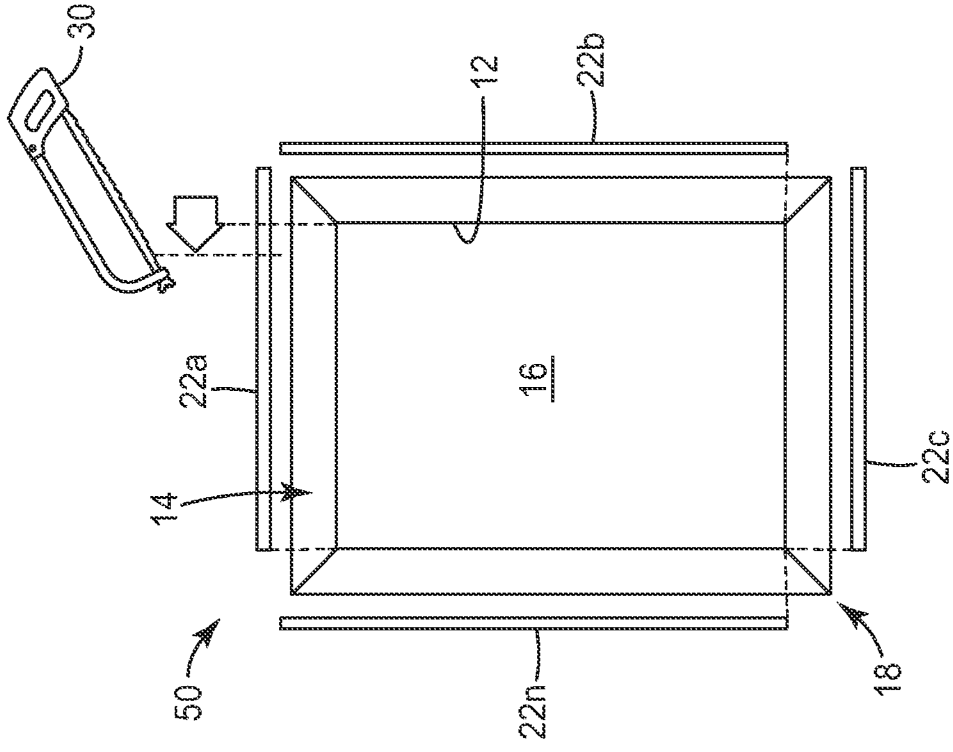
FIG. 1A is a schematic view of one aspect of a method of forming a frame assembly to be used in mounting a window film sheet structure in spaced apart relationship to a window.

Before making the window film frame assembly 10, the size and shape of the opening 12 are determined. As seen in FIG. 1A the frame segments 22 may then be appropriately measured and cut. A cutting tool 30, such as a hacksaw 30 may used. Alternatively, pre-cut frame segments may be utilized in a kit 50, portions of which are collectively illustrated in FIGS. 1A-8. Since the corner connector members 24 are to be used, the respective linear dimensions of the frame segments 22, as viewed in FIG. 1A are shortened by suitable distances to accommodate the corner connector members 24. The frame assembly 18 thus formed snuggly fits the opening 12 (see, FIGS. 2 and 7). While the corner connector members are illustrated for forming a frame, other various attachment schemes may be used. These other attachment schemes include, but are not limited to tape, clamps, adhesives, such as glue, or the like.

In this embodiment, the window film sheet structure 20 may be a transparent plastic material that is flexible and yet has sufficient stiffness so that it can retain its dimensions and shape. In addition, the window film sheet structure 20 is to have its major exterior surfaces without an adhesive layer. There are a number of approaches for attaining such a configuration within the spirit and scope of this invention.

In one illustrated embodiment (see FIG. 8), the window film sheet structure 20 is a window film structure that includes a removable clear linear 32 joined to a film base structure 34 through a pressure-sensitive adhesive layer (not shown). Instead of removing the clear liner 32, it will remain with the base structure 34. Accordingly, the film will have a thickness in a range that will provide the requisite stiffness. This window film sheet structure 20 may be of the solar window film type. The clear liner can be made of a suitable polyester, vinyl, or the like and the film base structure 34 can be made of a suitable polypropylene, polyethylene material as well as an adhesive layer (not shown). Other suitable polymeric sheet materials can be used for the above materials. Whatever materials are used, the collective thicknesses should be sufficiently thick for the window film sheet structure 20 to be flexible and yet stiff enough to hold its dimensions during use. For example, the window film sheet structure may have a thickness in the range of about 5 mil to about 10 mil. One commercial version of such a film structure is Prestige™ that is commercially available from 3M Company, St. Paul, Minn. This film has a base structure made of a polyester material and an adhesive structure layer (not shown) made of and a clear liner also made of a polyester material. This film has a thickness of about 1 to 8 mil. The versions providing for the stiffness are intended to be used. While Prestige™ film is used, other commercial embodiments are envisioned. For example, Scotch® Tint window film that is commercially available from 3M Company, St. Paul, Minn. may be used. While the window film sheet structure 20 noted typically has its clear liner removed, this invention envisions not removing such so as to impart stiffness. In this manner, the window film sheet structure 20 will retain its planar relationship and avoid being too flimsy and creasing so as to cause permanent flaws therein. Another embodiment contemplates using a window film structure with an additional transparent layer that is added to a window film structure. The additional layer serves to increase thickness of the window film sheet structure so that the latter will obtain desired stiffness. The additional layer may be co-extruded with the window film base structure. The additional layer is essentially added to provide stiffness to the overall window film sheet structure. In this manner, the window film sheet structure will tend to retain its dimensions and planarity, such as when mounted to the film frame assembly. The additional layer is intended to primarily be a transparent material that does not posses any additional optical properties that affect the functioning of the window film sheet structure. Alternatively, the additional layer may have added thereto, in any suitable manner, materials that can alter the optical properties of the overall window film sheet structure.

The window film sheet structures may be selected from a group of window film structures that comprises solar window film, privacy window film, security window film, graphic design film, frosted finish film or any combination thereof. The foregoing films may reflect ultraviolet and infrared solar energy as well as posses other known characteristics.

Provision is made for a kit 50 (see FIGS. 1-8) containing components that facilitate an installer being able to customize the window film frame assembly to a window assembly having a wide variety of shapes and sizes and in a do-it-yourself manner. As illustrated in FIG. 1A, the kit 50 includes a set of four metal frame segments 22 as well as a plurality of frame corner connector members 24. After being measured and cut to size, the frame segments 22 and the connector members 24 are laid out, such as shown in FIG. 1B, to be assembled into the frame assembly 18. In this regard, an installer merely inserts each one of the corner connector members 24 into respective openings at the end of the frame segments 22. A tool (not shown) may be used to forcibly drive the corner connector members 24 into the frame segments 22. The frame segments 22 are oriented so as to be orthogonal with respect to each other.

Figure 3A:
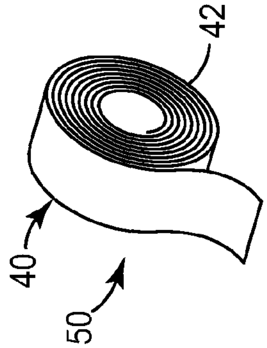
FIG. 3A is a schematic view of a roll of pressure-sensitive adhesive tape.
Figure 3:
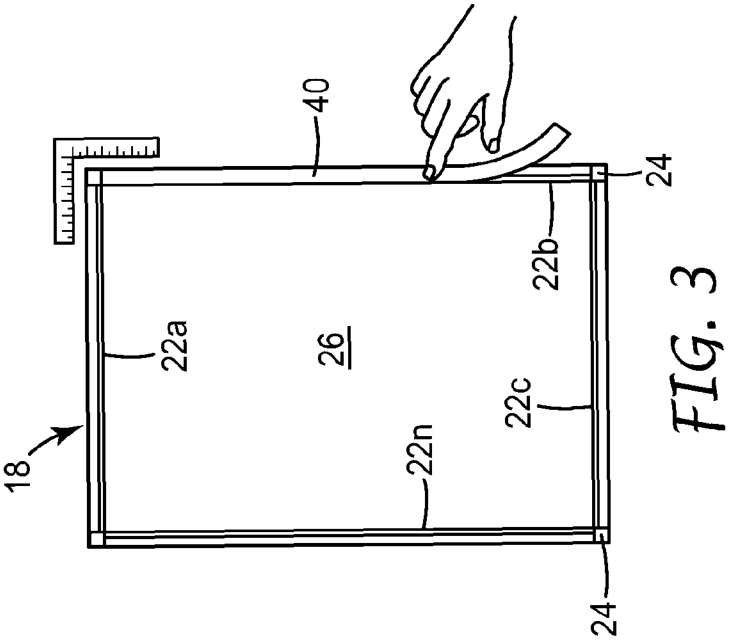
FIG. 3 is a schematic view of applying pressure-sensitive adhesive tape along one side of the frame assembly.
Figure 2:
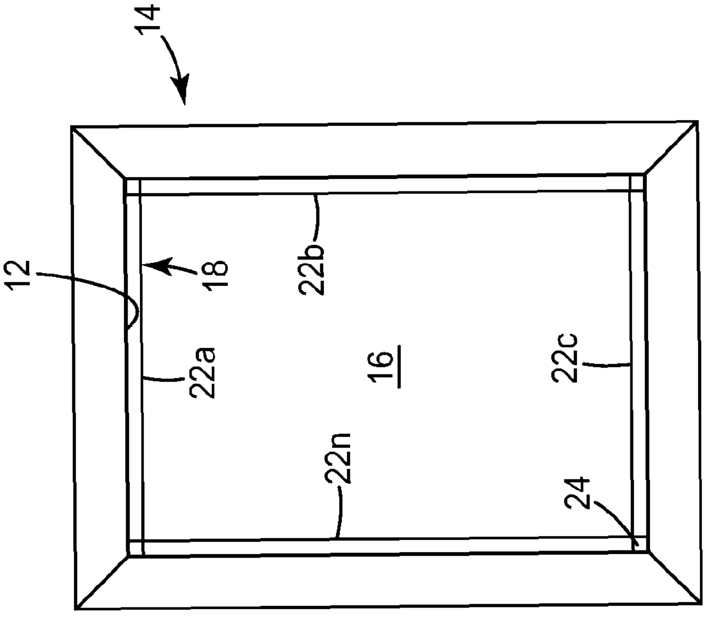
FIG. 2 is a schematic view of mounting the frame assembly in an opening of a window assembly.

The frame assembly 18 may then be test fit (see FIG. 2) into the opening 12 formed adjacent the window assembly 14. As seen in FIG. 3, the frame assembly 18 is squared and pressure-sensitive adhesive stripes 40 are added along one side of the frame segments. In one illustrated embodiment, the pressure-sensitive adhesive stripes 40 may be of the double-coated type. The invention contemplates use of various kinds of pressure-sensitive adhesives including removable and permanent. The invention also envisions other suitable kinds of adhesive systems. As such, the pressure-sensitive adhesive stripes 40 may be cut from a roll 42 (FIG. 3A) thereof that may be provided in the kit 50.

Figure 4:
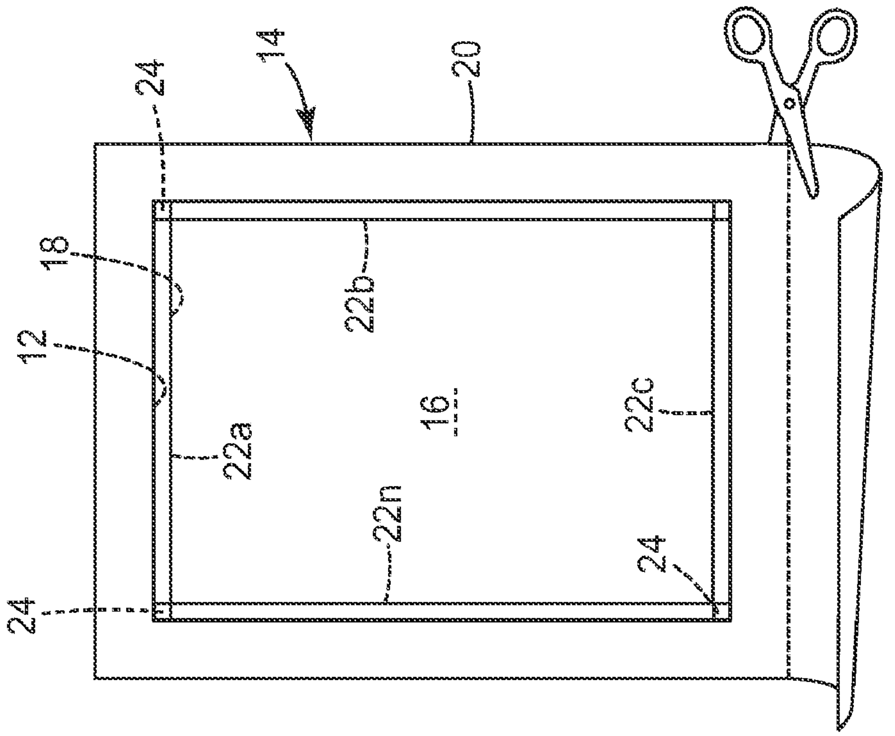
FIG. 4 is a schematic view of a window film sheet structure being placed over the adhesive portion of a window prior to being cut the film being laminated thereto.
Figure 8:
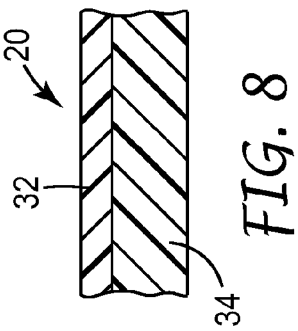
FIG. 8 is a partial and enlarged view of the window film sheet structure that is usable in the present invention.
Figure 6:
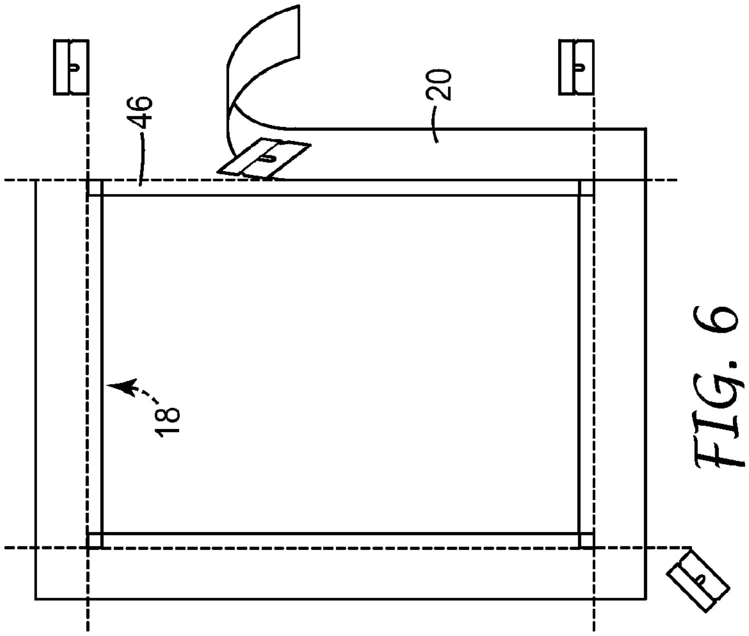
FIG. 6 is a schematic view of the window film sheet structure being trimmed to the size and shape of the frame assembly.

As illustrated in FIG. 4, an oversized web of the window film sheet structure 20 is placed over the frame assembly 18 so that it can be cut to the proper dimensions. As seen in FIG. 5, the window film sheet structure 20 has been removed and release liners 44 of the pressure-sensitive adhesive stripes 40 are removed, thereby exposing their adhesive portions 46. The adhesive portions 46 are to engage and hold to the film structure 20 to the frame. Then as shown in FIG. 6, the cut window film sheet structure is joined to the pressure-sensitive adhesive stripes, whereby the margin beyond the frame is trimmed as by a razor or other suitable cutting implement. Once it is trimmed, the window film frame assembly 10 is ready to be installed in the window opening 12, such as illustrated in FIG. 7. Because of the foregoing arrangement, the R-value rating may be increased.

In order to implement the foregoing, the present invention provides of a kit 50 as follows. This kit 50 is to be used in the context of a do-it-yourself environment. It includes as noted, four metal frame segments 22 as well as a plurality of frame corner connector members 24; a web of the window film sheet structure 20; a roll 42 of pressure sensitive stripes 40, a cutting tool 30, as well as a set of instructions.

The above embodiments have been described as being accomplished in a particular sequence, it will be appreciated that such sequences of the operations may change and still remain within the scope of the invention. Also other procedures may be added.

This invention may take on various modifications and alterations without departing from the spirit and scope. Accordingly, this invention is not limited to the above-described embodiments, but is to be controlled by limitations set forth in the following claims and any equivalents thereof.

This invention also may be suitably practiced in the absence of any element not specifically disclosed herein. All patents and publications noted above, including any in the Background section are incorporated by reference into this document in total.

What is claimed is:

1. A window film frame assembly comprising:
a film frame assembly including
a frame defining a frame opening,
one or more pressure-sensitive adhesive portions applied to at least one side of the frame, and
a generally flexible film sheet structure attached to the one or more pressure-sensitive adhesive portions and covering the frame opening, wherein the film sheet structure has stiffness so as to conform to the shape of the frame across the frame opening; and
a window assembly defining an opening adjacent a transparent panel,
wherein the film frame assembly is installed in the opening of the window assembly and over the transparent panel.

2. The window film frame assembly of claim 1, wherein the window film sheet structure includes non-adhesive exterior major surfaces.

3. The window film frame assembly of claim 2, wherein the window film sheet structure is selected from a group that comprises solar window film, privacy window film, security window film, graphic design window film, frosted finish window film and any combination thereof.

4. The window film frame assembly of claim 3, wherein the window film sheet structure has a thickness in the order of at least about 5 mil.

5. The window film frame assembly of claim 4, wherein the window film sheet structure has a thickness in the order of about 5 mil to about 10 mil.

6. The window film frame assembly of claim 1, wherein the frame is comprised of a plurality of frame segments, and a plurality of corner connecting members, each one of the corner connecting members is connected to two adjacent frame segments and the frame segments and the corner connecting members are assembled together to form the frame assembly.

7. The window film frame assembly of claim 1, wherein the one or more pressure-sensitive adhesive portions is applied to multiple segments of the frame on at least one side of the frame.

8. A method of making a window film frame assembly, the method comprising:
providing a film frame assembly including
a frame defining a frame opening,
one or more pressure-sensitive adhesive portions applied to at least one side of the frame, and
a generally flexible film sheet structure attached to the one or more pressure-sensitive adhesive portions and covering the frame opening, wherein the film sheet structure has stiffness so as to conform to the shape of the frame across the frame opening;
providing a window assembly defining an opening adjacent a transparent panel; and
installing the film frame assembly in the opening of the window assembly and over the transparent panel.

9. The method of claim 8, wherein the providing of a frame includes providing a plurality of frame segments, and a plurality of corner connecting members, each one of the corner connecting members is connected to two adjacent frame segments and the frame segments and the corner connecting members are assembled together to form the frame assembly.

10. The method of claim 8, wherein the film sheet structure includes non-adhesive exterior surfaces.

11. The method of claim 8, wherein the window film sheet structure provided has a thickness in the order of about 5 mil to about 10 mil.

12. The method of claim 8, wherein the window film sheet structure is selected from a group that comprises solar window film, privacy window film, security window film, graphic design window film, frosted finish window film and any combination thereof.

13. The method of claim 8, wherein the one or more pressure-sensitive adhesive portions is applied to multiple segments of the frame on at least one side of the frame.

* * * * *

UNITED STATES PATENT AND TRADEMARK OFFICE

CERTIFICATE OF CORRECTION

PATENT NO. : 8,372,508 B2
APPLICATION NO. : 11/618015
DATED : February 12, 2013
INVENTOR(S) : Robert J. Reuter It is certified that error appears in the above-identified patent and that said Letters Patent is hereby corrected as shown below:

Title Page Column 1 (Title)
On the Title Page, Item (54) and in the Specification, Column 1, Lines 1-2, Title:
delete “ASSEMBLIES AND METHODS” and insert -- ASSEMBLIES FOR INSTALLATION OVER WINDOWS AND METHODS --, therefor.

In the Specification
Line 12, delete “Methods”,” and insert -- Methods”; --, therefor.

Line 23, delete “flows” and insert -- flaws --, therefor.

Column 2
Line 33, delete “prolematic” and insert -- problematic --, therefor.

Column 5
Line 19, delete “mater” and insert -- mate --, therefor.

Line 54, delete “linear” and insert -- liner --, therefor.

Column 6
Line 30, delete “posses” and insert -- possess --, therefor.

Line 41, delete “posses” and insert -- possess --, therefor.

Signed and Sealed this
Seventeenth Day of September, 2013

Teresa Stanek Rea
*Deputy Director of the United States Patent and Trademark Office*